United States Patent [19]
Yoshida et al.

[11] Patent Number: 4,966,008
[45] Date of Patent: Oct. 30, 1990

[54] ARRANGEMENT OF ICE FULLNESS DETECTOR IN ICE MAKING MACHINE

[75] Inventors: Kazuhiro Yoshida; Yoshinori Tanaka, both of Toyoake, Japan

[73] Assignee: Hoshizaki Electric Company Ltd., Sakae, Japan

[21] Appl. No.: 468,503

[22] Filed: Jan. 23, 1990

[30] Foreign Application Priority Data

Feb. 4, 1989 [JP] Japan .................... 1-12419

[51] Int. Cl.$^5$ .............................................. F25C 1/00
[52] U.S. Cl. ........................................ 62/137; 62/344; 340/617
[58] Field of Search .................. 62/137, 344; 340/616, 340/617, 624; 414/294, 295

[56] References Cited

U.S. PATENT DOCUMENTS

| | | | |
|---|---|---|---|
| 2,961,842 | 11/1960 | Wright | 340/617 X |
| 3,045,444 | 7/1962 | Todd | 62/137 |
| 3,144,755 | 8/1964 | Kattes | 62/137 |
| 3,192,734 | 7/1965 | Swanson | 62/137 |
| 3,911,691 | 10/1975 | Kohl et al. | 62/137 |
| 4,610,147 | 9/1986 | Kawasumi | 62/137 |
| 4,662,182 | 5/1987 | Tsukiyama et al. | 62/137 |
| 4,771,609 | 9/1988 | Funabashi | 62/137 |

*Primary Examiner*—William E. Tapolcai
*Attorney, Agent, or Firm*—Schwartz & Weinrieb

[57] ABSTRACT

Disclosed is an arrangement of an ice fullness detector within an ice making machine composed of an ice making unit and an ice reservoir upon which the ice making unit can be separably stacked, wherein ice cakes formed within the ice making unit are discharged into the ice reservoir through an opening defined within the bottom wall of the ice making unit so as to be stored within the reservoir. The detector further comprises a detector assembly having an ice fullness detector at the lower end and a horizontal portion formed at a predetermined position so as to function as a stopper; and a slot formed within the bottom wall of the ice making unit adjacent to an opening of the ice making unit which allows passage therethrough of the detector but not the horizontal portion thereof wherein the detector can be brought down into the ice reservoir at a predetermined position by pulling the lower end of the assembly downwardly through the slot until the horizontal portion is abutted against the bottom wall of the ice making unit. A hook is provided upon the inner wall surface of the ice making unit at a height from the bottom wall of the ice making unit which is high enough to accommodate the full length of the assembly, so that the assembly can be hooked upon the inner wall surface of the ice making unit when the detector need not be present within the ice reservoir.

12 Claims, 4 Drawing Sheets

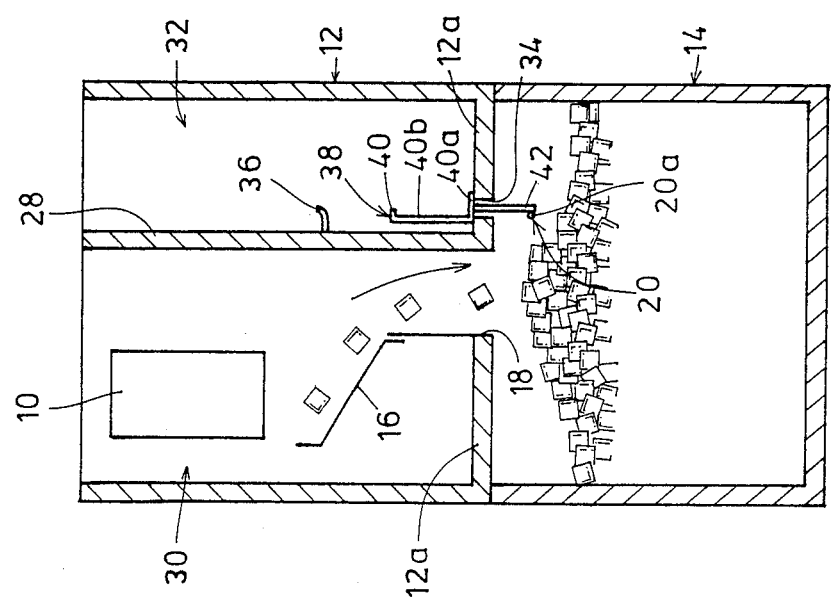
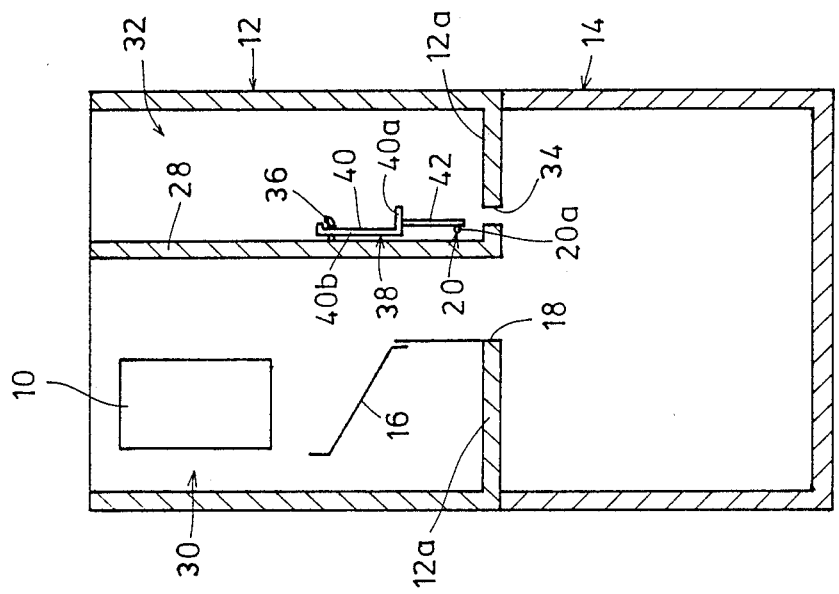

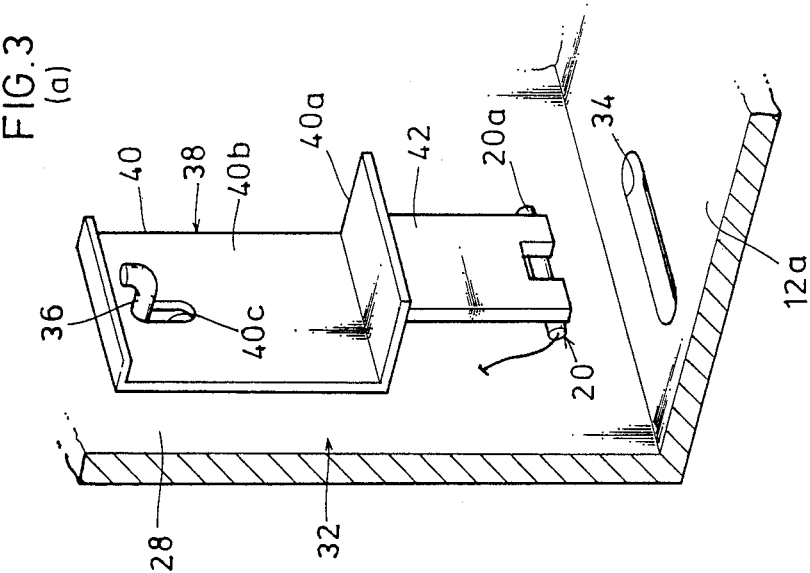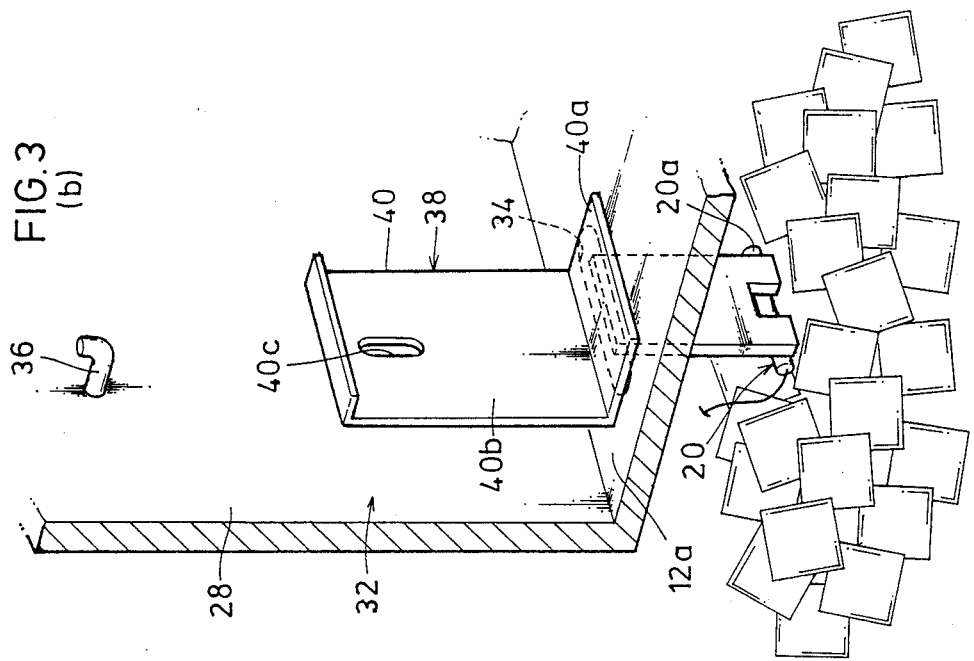

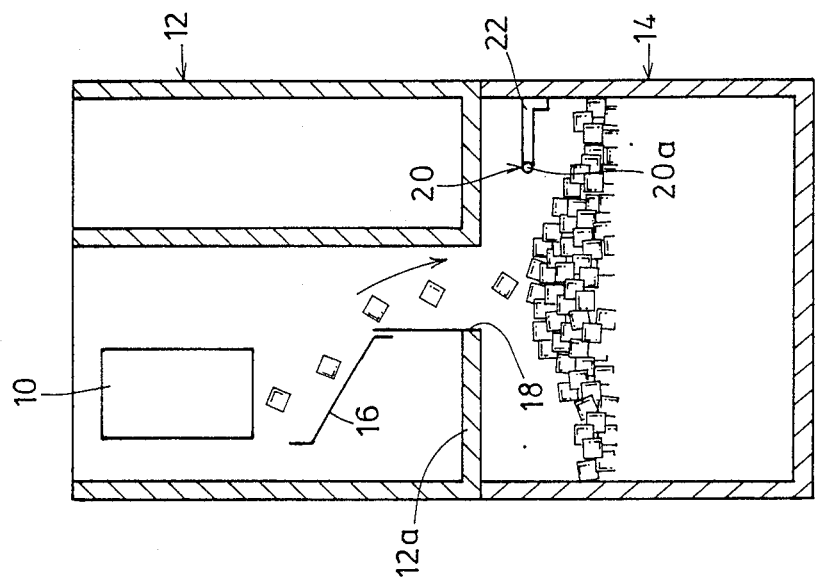
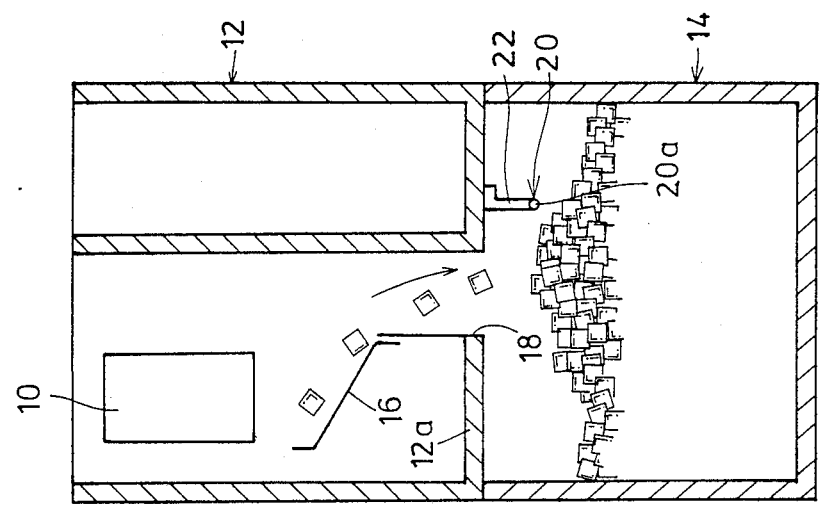

ARRANGEMENT OF ICE FULLNESS DETECTOR IN ICE MAKING MACHINE

FIELD OF THE INVENTION

This invention relates to an arrangement of an ice fullness detector which facilitates the accurate mounting of the ice fullness detector within a stack-on type ice making machine comprising an ice making unit having an ice making mechanism and a freezer, and an ice reservoir upon which the ice making unit is adapted to be stacked.

BACKGROUND OF THE INVENTION

Various types of automatic ice making machines for continually making various shapes of ice cakes including cubes and plates in large quantities are suitably utilized depending upon the applications required. For example, popular ice making machines include:

(1) so-called closed cell system ice making machines having a multiplicity of freezing cells opening downwardly and formed within a freezing chamber, within which the freezing cells can be separably closed by means of a water tray, and water for freezing is injected into the freezing cells through means of the water tray so as to gradually form ice cubes therein;

(2) so-called open cell system ice making machines having a multiplicity of freezing cells opening downwardly, within which water to be frozen is directly injected into the freezing cells in the absence of a water tray so as to form ice cubes the freezing cells; and (3) flow-down system ice making machines having a tilted freezing plate, within which water to be frozen is supplied so as to flow upon the upper or lower surface of the freezing plate so as to form an ice plate upon the corresponding surface.

According to any one of these freezing systems, the automatic ice making machine generally has an ice making unit for making ice cakes disposed at an upper position of the housing of the machine, and an ice reservoir disposed below the ice making unit, so that the ice cakes formed in the ice making unit may gradually be accumulated within the ice reservoir. However, such types of ice making machines having an integral structure of the ice making unit and the ice reservoir sometimes are not satisfactory for large-scaled shops where ice demand increases greatly depending upon the time zone and season or for consumers who use large amounts of ice cakes. In such cases, stack-on type ice making machines can be suitably used. The stack-on type ice making machine comprises an ice making unit 12 having an ice making mechanism 10 and a freezer (not shown), and an ice reservoir 14, as shown in FIG. 4, which are formed separately as independent mechanical units, such that the ice making unit 12 can be combined with an ice reservoir 14 having a desired level of capacity and can be stacked upon the latter ice reservoir 14.

In such stack-on type ice making machines, a guide plate 16 is disposed in an inclined manner below the ice making mechanism 10, and an opening 18 is formed within the bottom wall 12a of the unit 12 at a position beneath the lower end of the inclined guide plate 16, whereby the ice cakes formed within the ice making mechanism 10 slide along the guide plate 16, after they are released, and into the ice reservoir 14 through means of the opening 18, so as to be stored therein. Furthermore, a means 20 for detecting when the ice cakes reach a predetermined level (so-called ice fullness detector) is disposed within the ice reservoir 14. The detector 20 is designed to detect the fullness of the ice reservoir 14 with respect to the accumulation of the ice cakes and stop the operation of the ice making machine.

The following arrangements of the ice fullness detector 20 are known. For example, as shown in FIG. 4, a predetermined length of detector member 22 is fixed so as to extend downwardly from the bottom wall 12a of unit 12 at a position adjacent to the opening 18 defined within the bottom wall 12a of the ice making unit 12, and the ice fullness detector 20 includes a temperature element 20a which is attached to the lower end of the detector member 22 such that the temperature element 20a is disposed at the tip thereof. Accordingly, when the level of the ice cakes being accumulated within the ice reservoir 14 increases after an operation of the ice making machine for some period of time, the uppermost ice cakes contact the temperature element 20a. Thus, the detector detects the fullness of the ice reservoir 14 with the accumulation of ice cakes and stops the operation of the ice making machine. Alternatively as shown in FIG. 5, a detector member 22 is fixed upon the internal wall surface of the ice reservoir 14 so as to protrude inwardly therefrom, and the temperature element 20a is attached to the tip of the detector member 22. Incidentally, since the ice cakes being accumulated within the ice reservoir 14 assume a heap having its apex immediately below the opening 18, the temperature element 20a of the ice fullness detector 20 is disposed so as to be adjacent to the opening 18.

As another arrangement, as shown in FIG. 6, a cavity 24 opening downwardly is defined within bottom section of the ice making unit 12, and also a through hole 26 is formed within a side wall of unit 12 adjacent the guide plate 16, and opening into the cavity, so as to allow passage of the ice cakes sliding downwardly along the guide plate 16. A detecting member 22 is also fixed upon the opposite wall of this cavity 24, or upon the side wall opposing disposed opposite the through hole 26, and the temperature element 20a of the ice fullness detector 20 is disposed at the free end of the detecting member 22. In the last mentioned case, the temperature element 20a detects the fullness of the ice reservoir 14 when the ice cakes having been made within the ice making mechanism 10 fills the cavity 24 after filling the ice reservoir 14.

As described above, while the ice fullness detector 20 is fixed to the ice making unit 12 or to the ice reservoir 14, actual mounting of the detector 20 involves many difficulties since it is mounted in a predetermined state or position corresponding to the relatively aligned disposition of the unit 12 and reservoir 14 when the ice making unit 12 is stacked upon the ice reservoir 14. To describe such in detail, in the structures as shown in FIGS. 4 and 5, in order to properly affix the detector 20 upon or within the ice making machine, the operator must remove a cover (not shown) disposed upon the top of the ice making unit 12, and put his hands through the upper opening of the ice making unit 12 and through the small opening 18 so as to fix the detecting member 22 having the ice fullness detector 20 disposed thereon onto the internal wall surface of the ice reservoir 14 or upon the lower surface of the bottom wall 12a of the ice making unit 12. Thus, the above structures involve a problem of greatly reducing the operational efficiency. Moreover, the required installation operation within the limited space forces the operator to assume a difficult position, and consequently ice fullness detectors 20 often cannot be disposed correctly in position. As a result of such inaccurate disposition of the detector 20, the detector 20 fails to correctly detect the fullness of the ice reservoir 14 at the proper time even when more than the predetermined amount of ice cakes are accumulated therein and the ice cakes often overflow the ice reservoir 14 so as to reach the ice making mechanism 10 and thereby cause damage to the ice making mechanism 10.

Furthermore, in connection with the inspection and maintenance of the ice making machine, while the ice fullness detector 20 must be removed when the ice making unit 12 is separated from the ice reservoir 14, this removal requires intricate handling. It can also be pointed out that the arrangement shown in FIG. 5 involves a problem in that the ice fullness detector 20 can be damaged, since the detector 20 is disposed toward the inside of the ice reservoir 14 if the ice making unit 12 is separated from reservoir 14 without removing the ice fullness detector 20 therefrom.

In the arrangement shown in FIG. 6, the cavity 24 defined within the ice making unit 12 should be designed to have dimensions such that it can allow the smooth passage of the group of ice cakes made during one cycle of operation of the ice making mechanism 10. In determining the capacity of the cavity 24, if it is allowed to have a sufficiently large capacity, then the entire ice making unit tends to be disadvantageously larger.

OBJECT OF THE INVENTION

This invention has been proposed in view of the above problems inherent in the arrangement of the ice fullness detector mechanisms of the prior art and for the purpose of solving them successfully and furthermore is directed toward providing a means which can greatly facilitate the accurate fixing or installation of the ice fullness detector, as well as facilitating the removal thereof when required.

SUMMARY OF THE INVENTION

In order to overcome the above problems and to attain the intended object, this invention proposes an arrangement of an ice fullness detector within a stack-on type ice making machine composed of an ice making unit having an ice making mechanism and a freezing unit, and an independent ice reservoir unit upon which the ice making unit can be separably stacked, wherein ice cakes formed within the ice making mechanism are discharged into the ice reservoir through means of an opening defined within the bottom of the ice making unit so as to be stored within the reservoir unit; characterized by the constitution, comprising:

a detector mounting assembly having an ice fullness detector mounted upon the lower end thereof and a horizontal portion formed at a predetermined position so as to function as a stopper; and a slot formed within the bottom wall of the ice making unit adjacent to the opening of the ice making unit which allows passage there through of the ice fullness detector of the detector mounting assembly but not the horizontal portion thereof;

wherein the ice fullness detector attached to the detector mounting assembly can be brought down into the ice reservoir to a predetermined position by pulling down the lower end of the detector mounting assembly through the slot until the horizontal portion of the detector assembly is abutted against the bottom wall of the ice making unit.

As has been described above, according to the arrangement of the present ice fullness detector within the ice making machine, the ice fullness detector attached to the lower end of the detector mounting assembly can be brought down into the ice reservoir only by means of a simple operation mounting pulling down the lower end portion of the detector mounting assembly through the slot formed within the bottom wall of the ice making unit. Moreover, since the detector mounting assembly has a horizontal portion which functions as a stopper, the ice fullness detector can be fitted in position within the ice reservoir by allowing the horizontal portion to be abutted against the bottom wall of the ice making unit. The mounting operation can be carried out speedily so as to achieve a reduction in the mounting time since the ice fullness detector can be disposed within the relatively wide space of the ice making unit. Still further, the arrangement of this invention provides advantages in that the operator is not forced to assume an uneasy posture unlike in the conventional arrangements and that the labor imposed upon the operator can be reduced.

BRIEF DESCRIPTION OF THE DRAWINGS

Various other objects, features, and attendant advantages of the present invention will become more fully appreciated from the following detailed description, when considered in connection with the accompanying drawings, in which like reference characters designate like or corresponding parts throughout the several views, and wherein:

FIG. 1 schematically shows in vertical cross section a stack-on type automatic ice making machine in which the arrangement of the ice fullness detector according to the embodiment is employed.

FIG. 2 schematically shows in vertical cross section the automatic ice making machine illustrating the state wherein the ice fullness detector is brought down into the ice reservoir.

FIG. 3(a) shows schematically a perspective view of the pertinent portion of the detector mounting assembly wherein the same is suspended upon a hook.

FIG. 3(b) shows schematically a perspective view of the pertinent portion of the lower end of the detector mounting assembly when the same is inserted through the slot.

FIG. 4 schematically shows in vertical cross section an automatic ice making machine illustrating an arrangement of the ice fullness detector according to a prior art embodiment.

FIG. 5 schematically shows in vertical cross section an automatic ice making machine illustrating an arrangement of the ice fullness detector according to another prior art embodiment.

PREFERRED EMBODIMENT OF THE INVENTION

Figure 6:
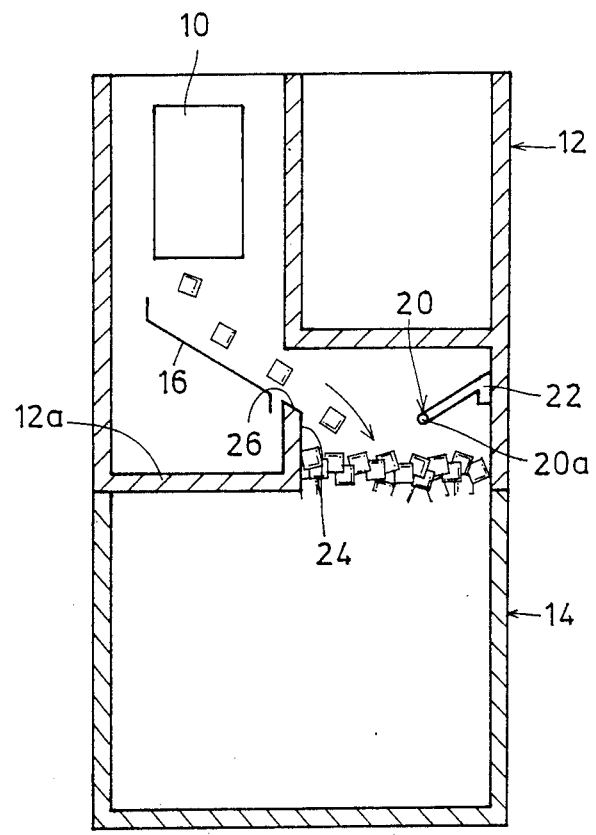
FIG. 6 schematically shows in vertical cross section an automatic ice making machine illustrating an arrangement of the ice fullness detector according to another prior art embodiment.

Now, the arrangements of the ice fullness detector within the ice making machine constructed according to this invention will be described by means of preferred embodiments with reference being made to the attached drawings.

FIG. 1 shows an embodiment of a stack-on type automatic ice making machine in which the present invention can effectively be practiced. This ice making machine has an ice making unit 12 divided into a first space 30 and a second space 32 by means of a partition 28. An ice making mechanism 10 is disposed within the first space 30; whereas a freezer is disposed within the second space. Ice cakes formed within the ice making mechanism 10 and released therefrom slide along the guide plate 16 disposed below the ice making mechanism 10, pass through an opening 18 defined within a bottom wall 12a of the unit 12, and are stored within an ice reservoir 14. Incidentally, a front panel (not shown) is removably disposed upon the front of the ice making unit 12, which is removed when the ice fullness detector 20 is installed as will be described later.

Upon the surface of the partition 28 facing into the second space 32, there is provided a hook 36 which protrudes at a predetermined height as measured from the bottom wall 12a that is at a position higher than the height or longitudinal size of a detection mounting assembly 38 to be described later, and the detection mounting assembly 38 as shown in FIGS. 3(a) and 3(b) is removably suspended upon the hook 36. The detector mounting assembly 38 comprises an L-shaped first member 40 and a second member 42 formed so as to extend perpendicularly from the bottom surface of the horizontal portion 40a of the first member 40. The detector mounting assembly 38 can be accommodated within the second space 32 by engaging the hole 40c formed near the upper end of the perpendicular portion 40b of the first member 40 with the hook 36 (see FIG. 1).

The second member 42 is formed so as to extend downwardly from the horizontal portion 40a along the center of the horizontal portion 40a so as to be parallel with the perpendicular portion 40b, and the ice fullness detector 20 with the temperature element 20a is attached to the lower end of the second member 42. A conduit leading out of the temperature element 20a is connected to the body (not shown) of the ice fullness detector 20 disposed within in the ice making unit 12.

Incidentally, it will of course be appreciated that the conduit is designed to have a size long enough to allow free movement of the temperature element 20a when the detector mounting assembly 38 is unhooked from the hook 36 so as to bring the temperature element 20a attached to the mounting assembly 38 down into the ice reservoir 14.

Within the bottom wall 12a of the unit 12 and within the second space 32 defined within the ice making unit 12, a slot 34 is formed at a position adjacent to the opening 18 so as to open to be the ice reservoir 14, as shown in FIGS. 3(a) and 3(b). This slot 34 is designed to have dimensions such that it can allow easy insertion of the second member 42 of the detector mounting assembly 38 having the temperature element 20a attached thereto but not the horizontal portion 40a of the detector mounting assembly 38. In other words, the horizontal portion 40a serves as a stopper for positioning the temperature element 20a of the ice fullness detector 20 at a predetermined position, when the temperature element 20a is brought down into the ice reservoir 14. Accordingly, if the detector mounting assembly 38 is unhooked from the hook 36 and the second member 42 is inserted through the slot 34 as shown in FIGS. 2 and 3(b) until the horizontal portion 40a is abutted against the bottom wall 12a of the unit 12, positioning of the mounting assembly 38 can be achieved and the temperature element 20a attached to the lower end of the second member 42 can be brought down into the ice reservoir 14 to the proper position. The detector mounting assembly 38 can then be fixed in this state upon the bottom wall 12a wall of unit 12 by a suitable means.

The length from the horizontal portion 40a of the detector mounting assembly 38 to the position where the temperature element 20a is attached is preset in such a way that the temperature element 20a maybe at a predetermined level below the bottom wall 12a of unit 12 (that is, at a position corresponding to the capacity of the ice reservoir 14) when the second member 42 is brought down into the ice reservoir 14.

Next, the function of the arrangement of the ice fullness detector within the ice making machine constructed according to the above embodiment will be described. Within the second space 32 of the ice making unit 12, the detector mounting assembly 38 having attached thereto the ice fullness detector 20 with the temperature element 20a is hooked upon the hook 36 as shown in FIG. 3(a). The operator should first place the ice making unit 12 upon the top of the ice reservoir 14 so as to position the upper and lower units with respect to each other and fix the same together. Then, the operator brings the temperature element 20a of the ice fullness detector 20 attached to the assembly 38 downwardly into the ice reservoir 14.

To describe the foregoing in detail, the operator can remove the front panel disposed upon the front side of the ice making unit 12 and put his hand into the second space 32 so as to unhook the detector mounting assembly 38 from the hook 36. Then, he moves the second member 42 of the assembly 38 downwardly into the slot 34 so as to bring the temperature element 20a attached to the tip of the member 42 into the ice reservoir 14, as shown in FIG. 3(b). In the above operation, the detector mounting assembly 38 is positioned with the horizontal portion 40a of the first member 40 being abutted against the bottom wall 12a of unit 12 since the slot 34 is designed to have a dimension which does not allow passage therethrough of the horizontal portion 40a. The temperature element 20a of the ice fullness detector 20 can be brought to a predetermined position within the ice reservoir 14, as shown in FIG. 2, by fixing the assembly 38 onto the bottom wall 12a of the unit 12 using an appropriate means.

When the ice making unit 12 is separated from the ice reservoir 14 for inspection and maintenance operations, as required, the order of fixing the detector mounting assembly 38 is reversed. Namely, after the detector mounting assembly 38 fixed upon the bottom wall 12a of unit 12 is released therefrom, the second member 42 is drawn upwardly through the slot 34. Subsequently, the hole 40c formed within the perpendicular portion 40b of the first member 40 is engaged with the hook 36 (see FIGS. 1 and 3(a)). Thus, the ice making unit 12 can be separated from the ice reservoir 14 in a smooth manner since the detector mounting assembly 38 is safely accommodated within the second space 32.

As has been described above, the temperature element 20a of the ice fullness detector 20 can be brought simply by moving into the ice reservoir 14 at a predetermined position only by pulling the second member 42 of the detector mounting assembly 38 accommodated within the second space 32 defined within the ice making unit 12 downwardly through the slot 34 until the horizontal portion 40a may be abutted against the bottom wall 12a of unit 12. Moreover, the operation of fixing or removing the detector fitting assembly 38 can be carried out within the second space 32 defined within the ice making unit 12 without forcing the operator to assume an uneasy posture, whereby the working efficiency can be notably improved.

Obviously, many modifications and variations of the present invention are possible in light of the above teachings. It is therefore to be understood that within the scope of the appended claims, the present invention may be practiced otherwise than as specifically described herein.

What is claimed is:

1. An ice fullness detector within a stack-on type ice making machine composed of an ice making unit, having an ice making mechanism and a freezing unit, and an independent ice reservoir unit upon which said ice making unit can be separably stacked, wherein ice cakes formed within said ice making mechanism are discharged into said ice reservoir through means of an opening defined within a bottom wall of said ice making unit and stored within said ice reservoir unit, comprising:
   a detector mounting assembly having an ice fullness detector mounted upon a lower end of said assembly and a horizontal portion formed at a predetermined position so as to function as a stopper; and
   a slot formed within said bottom wall of said ice making unit adjacent to said opening of said ice making unit which allows passage therethrough of said ice fullness detector of said detector mounting assembly but not the horizontal portion thereof;
   wherein said ice fullness detector attached to said detector mounting assembly can be moved downwardly from a stored position within said ice making unit to an ice detection position within said ice reservoir by moving said lower end of said detector mounting assembly downwardly through said slot until said horizontal portion of said detector assembly is abutted against said bottom wall of said ice making unit.

2. An ice fullness detector within an ice making machine according to claim 1, further comprising:
   a hook provided upon an inner wall surface of said ice making unit at a height as measured from said bottom wall of said ice making unit which is higher than the height of said detector mounting assembly, upon which hook said detector mounting assembly can be removably hooked, so that said detector mounting assembly and said ice fullness detector may be fully accommodated within said ice making unit by hooking said detector mounting assembly onto said hook when said ice fullness detector need not be present within said ice reservoir and is disposed at said stored position within said ice making unit.

3. An ice fullness detector as set forth in claim 1, wherein:
   said ice making unit comprises a partition plate for dividing said ice making unit into a first ice making compartment and a second freezer compartment.

4. An ice fullness detector as set forth in claim 3, wherein:
   said ice making mechanism is disposed within said first ice making compartment, and said freezing unit is disposed within said second freezer compartment.

5. An ice fullness detector as set forth in claim 4, further comprising:
   an inclined plate disposed within said first ice making compartment for guiding said ice cakes downwardly from said ice making mechanism to said opening defined within said bottom wall of said ice making unit and into said ice reservoir.

6. An ice fullness detector as set forth in claim 1, wherein:
   said ice fullness detector disposed upon said detector mounting assembly comprises a temperature sensing element disposed upon an end portion of said ice fullness detector.

7. An ice fullness detector as set forth in claim 3, wherein:
   said detector mounting assembly is disposed within said second freezer compartment.

8. An ice fullness detector as set forth in claim 2, wherein:
   said ice making unit comprises a partition plate for dividing said ice making unit into a first ice making compartment and a second freezer compartment.

9. An ice fullness detector as set forth in claim 8, wherein:
   said hook is disposed within said second freezer compartment.

10. An ice fullness detector as set forth in claim 8, wherein:
    said ice making mechanism is disposed within said first ice making compartment, and said freezing unit is disposed within said second freezer compartment.

11. An ice fullness detector as set forth in claim 10, further comprising:
    an inclined plate disposed within said first ice making compartment for guiding said ice cakes formed by said ice making mechanism downwardly from said ice making mechanism to said opening defined within said bottom wall of said ice making unit and into said ice reservoir.

12. An ice fullness detector as set forth in claim 2, wherein:
    said ice fullness detector disposed upon said detector mounting assembly comprises a temperature sensing element disposed upon an end portion of said ice fullness detector.

* * * * *